US000001355H

United States Statutory Invention Registration [19]

[11] Reg. Number: H1355

[43] Published: Sep. 6, 1994

Schabdach et al.

[54] REMOTE VOICE-CONTROLLED SYSTEM OF UNMANNED SMOKE GENERATOR DEVICES

[75] Inventors: Paul G. Schabdach, Churchville; Irving F. Barditch, Baltimore, both of Md.

[73] Assignee: The United States of America as represented by the Secretary of the Army, Washington, D.C.

[21] Appl. No.: 71,877

[22] Filed: Jun. 7, 1993

[51] Int. Cl.[5] ..... G08C 19/28

[52] U.S. Cl. ..... 340/825.74; 340/825.73

*Primary Examiner*—Ian J. Lobo

*Attorney, Agent, or Firm*—Anthony T. Lane; Edward Goldberg; Michael Sachs

[57] ABSTRACT

A voice channel remote control system for operating remote smoke generators for battlefield operations. The system includes a transmission end for sending a voice channel signal and a receiving end for receiving and acting on the signal. A tone generator for sending a tone signal of a least one tone digit from the transmission end is included. Also included is a microphone at the receiving end for receiving the tone signal. A tone decoder is operably connected to the microphone pickup, with the decoder being adapted to validate and decode the tone signal to provide a binary coded decimal output for receiving the tone signal to thereby provide a coded decimal output. This output is connected to a decoder/-driver which transforms the decimal output to provide a driving signal. Finally, a relay receives the driving signal and transmits an activation signal to thereby activate the remote smoke generator device.

6 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

REMOTE VOICE-CONTROLLED SYSTEM OF UNMANNED SMOKE GENERATOR DEVICES

GOVERNMENTAL INTEREST

The invention described herein may be made, used, or licensed by or for the Government for U.S. Governmental purposes.

FIELD OF THE INVENTION

The present invention relates to a remote signalling system, and more particularly to a system for transmitting remote control signals with high reliability to smoke generating devices at remote locations.

BACKGROUND OF THE INVENTION

During time of war, a screening smoke generator becomes a prime target. If the enemy can knock out the generator, then the smoke screen can be eliminated. The soldiers operating the generator are therefore in great danger since that region will be a focus for attack or counterattack. Other switching devices are similarly exposed when actuated by the operator on site.

One approach that has been tried without success is the concept that the smoke screen may be controlled by remote control, so that only the smoke generator is at risk. The personnel are at a remote location not revealed to the enemy, and therefore are in a safer condition. To date, the only remote systems available were expensive transmitter/receiver units requiring a special dedicated frequency.

Other systems tried without success are the inexpensive forms of radio frequency units such as those on model cars, planes or boats. These relatively inexpensive radio frequency units were tried with generators and other switching devices without success. Primarily, a range of 400 to 500 meters is not adequate to space the operator from the generator system. Typically, remote operation would be most effective over at least 1 or 2 kilometers. In the case of smoke generators a particular problem arose when the electrical characteristics of the turbine smoke generators caused false signals that led the electronics in the system to substantial variations in reliability. Moreover, in combat as well as in a variety of other circumstances, so many electrical signals are being transmitted from so many different locations that use of radio waves primarily, can only add to the confusion and detract from already low reliability.

Accordingly, it is an object of this invention to provide a system which is suitable for transmitting control signals to smoke generating devices at remote locations.

Another object is to provide a system capable of operating a switch or other go/no-go device by such transmitted control signals.

Other objects and advantages will appear hereinafter to those skilled in this art from a reading of the herein specification and drawings.

SUMMARY OF THE INVENTION

It has been discovered that the above and other objects of the present invention may be accomplished in the following manner. Specifically, a new remote control system has been discovered which employs a voice channel. The device includes a transmission end for sending a voice channel control signal and also includes a receiving end for receiving and acting on such the transmitted signals.

Included is a tone generator for sending a dual tone multifrequency (DTMF) code signal, such as a "TOUCH TONE" signal, of at least one particular tone, such as a tone signal as associated with at least one "TOUCH TONE" digit, from the transmission end. This "TOUCH TONE" signal is received by a microphone pickup device at the receiving end. A "TOUCH TONE" decoder is operably connected to the microphone, and the decoder is set to validate and decode the "TOUCH TONE" signal to provide a binary coded decimal output.

Decoder driver means are provided for receiving the coded decimal output and transforming the decimal output to provide a driving signal which in turn activates a relay or switch to turn on the smoke generator device being controlled.

BRIEF DESCRIPTION OF THE DRAWINGS

For a more complete understanding of the invention, reference is hereby made to the drawings, in which.

DETAILED DESCRIPTION OF THE INVENTION

Figure 1:
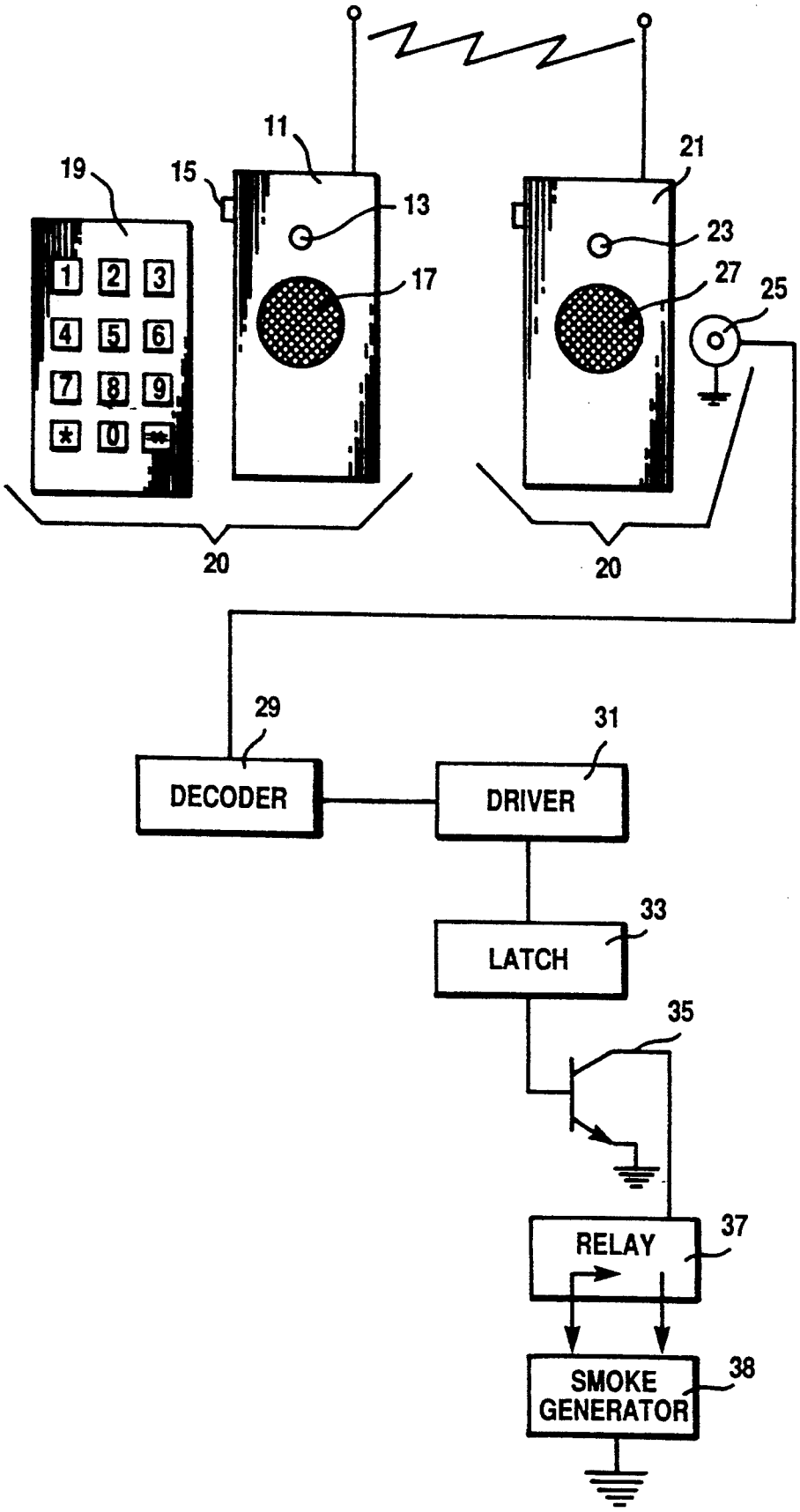
FIG. 1 is a schematic diagram showing a preferred embodiment of the invention.

The voice channel remote control system of this invention is shown generally in FIG. 1 by the reference number 20. The device is capable of operating over long range with complete accuracy and efficiency, and is secure from interference from those not needing access to the system.

The embodiment of the present invention shown in FIG. 1 includes a transmitting end, represented by walkie talkie 11 and a receiving end represented by walkie talkie 21. These two walkie talkies 11 and 21 are standard issue and operate in the conventional manner. Commercially available walkie talkie Company's TRC-87, TRC-89, TRC-207, TRC-218, TRC-219, TRC-221, TRC-222, Realistic TRC-501 or TRC-503, and other hand-held two-way radios operating in frequencies RF to UHF between 10 KHZ and 4,000 MHZ. The receiving walkie talkie 21 can be placed securely in a position for operation by remote control as is described below.

Walkie talkie 11 is turned on and a particular voice channel is selected in the normal manner usinq selector 13. The press to talk button 15 is operated. Walkie talkie 11 has a standard microphone 17 for transmitting sounds and microphone 17 has a key pad tone generator 19 placed against it. Key pad tone generator is a standard piece of equipment used in telephone communications, such as those used on rotary dial telephones when tone generation is required for remotely operating an answering machine. Examples of such commercial units are the Radio Shack #43-139, 43-141, and 43-144 portable pocket tone generators.

At the receiving end, walkie talkie 21 is turned on and tuned to the same voice channel as above, using selector 23. A small microphone pickup 25 is placed against speaker 2 of walkie talkie 21. When the desired tone is transmitted from key pad tone generator 19 and received by microphone 17 then transmitted and received by walkie talkie 21 and produced on speaker 27, then picked up by microphone 25 and then the tone is transmitted to touchtone decoder 29.

Decoder 29 determines if the tone is a valid tone and then decodes it to determine whatever digit the particular transmitted and preselected tone represents. Decoder 29 outputs a binary coded decimal (BCD) output to a decoder/driver 31. Decoder/driver 31 receives a binary coded decimal output from decoder 29, which output is in a hexidecimal form, and transforms that signal into a decimal output, as a zero to nine output.

The zero to nine output from decoder/driver 31 is transmitted to a latch 33, which in turn provides a signal to transistor 35 (depending on the output level from 31) and this in turn operates relay 37. Operation of relay 37 make an electrical closure turning on the smoke generator 38. The encoding is done using a 1690 Integrated Circuit DTMF encoder. Depending upon the circuit configuration, the generator may be turned on and off by operating the same digit twice, or by operating a second digit, resetting the latch 33 with the same effect.

Of course, multiple tones may be used for multiple functions, such as checking the availability of the unit or turning on a pre-use or warm-up function. Multiple tones may also be used for single functions, allowing for coding and (non-permitted) entry denial.

Even though both the transmitting walkie talkie 11 and the receiving unit 21 are coupled acoustically with, respectively, the key pad tone generator 19, and with the tone decoder 29 via pickup microphone 25, the units are still not affected by other tones or sounds which are sent or received by either unit 11 or 21. In fact, both walkie talkies can be used for other purposes when the remote system is not needed. One simple example is that a soldier servicing the smoke generator can report to the transmitting unit before leaving the area, indicating a safe operating condition. It is possible to have simultaneous transmission of voice signals with the tone type signals. The listener would just ignore the tones, however the receiving circuitry would recognize, and act upon the tones, as has been described.

Figure 2:
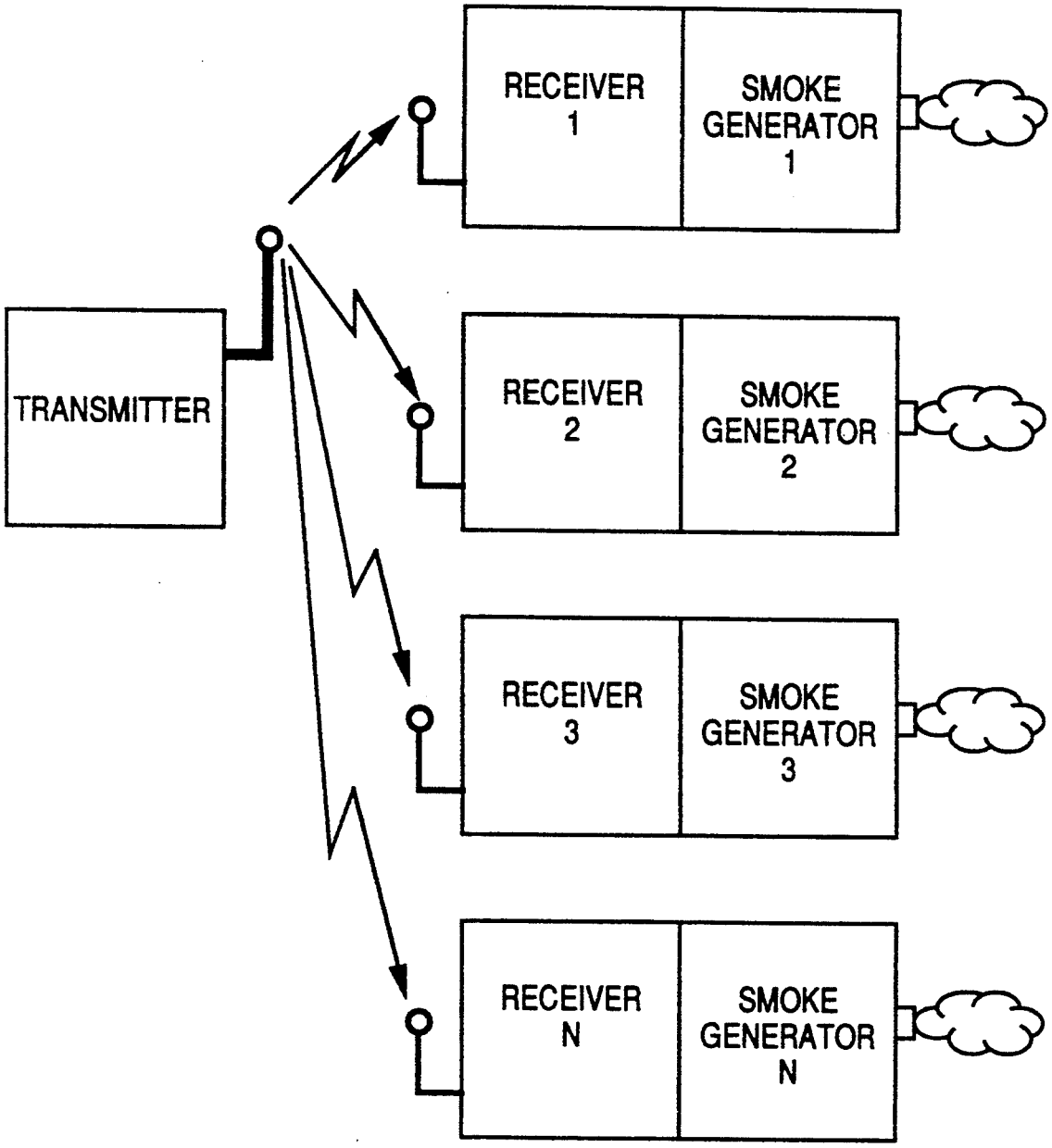
FIG. 2 shows a plural remote smoke generator application of the invention.

The advantages of the present invention are that it is inexpensive, extremely reliable, and very versatile. Only a voice channel is required for operations. Most any walkie talkie can be used, and the system has what ever range that such radios have. The system could be used with Citizen-Band (CB) transmitters or even commercial radio and/or television under appropriate circumstances. The system uses standard telephone technology which has extremely high reliability and which is not subject to stray signal transmission. While FIG. 1 may have depicted a single remote location smoke generating machine, it is possible under this invention to control a plurality of smoke generating machines from the same transmission device at the command location (see FIG. 2 for instance). Each machine would have its own respective similar receiving means and its own unique DTMF tone that would command it alone, though all the tones may be generated simultaneously (and together with human voice signals) from the same transmission device. FIG. 2 illustrates conceptually an embodiment of this invention where there are a plurality of remote smoke generators, commanded from a single transmission device. While particular embodiments of the present invention have been illustrated and described, the invention also includes those variations and substitutions as will occur to one skilled in this art.

We claim:

1. A system for remote control operation from a command location of an unmanned smoke generation machine positioned at a location remote from said command location said system comprising:

a transmission means at the command location for transmitting signals in the band of frequencies between RF and UHF to said remote location, said transmission means comprising a tone generator device for generating a particular acoustic DTMF tone binary coded decimal output signal, and a first microphone means for converting such DTMF tone signal into DTMF pulses which can be transmitted as first signals by said transmission means, said first microphone means also accepting human voice sounds which can be transmitted as second signals at a predetermined frequency by said transmission means; wherein said first and said second signals can be simultaneously transmitted;

receiving means at the remote location for receiving and detecting said first and second signals, said receiving means comprising a speaker means for producing audible sounds in response to said signals being received by said receiving means, a second microphone means acoustically coupled to said speaker means for converting said audible sounds into third signals, a decoder-driver means for receiving said third signals and generating a fourth signal when a particular DTMF tone signal is detected within said third signals, a latch-transistor means for generating a steady-on electrical signal in response to receipt of said fourth signal from said decoder-driver means, for closing a relay means selectively supplying or discontinuing connection of a high voltage power to said smoke generation machine in response to said steady-on signal from said latch-transistor means, whereby said receiving means can receive both said human voice sounds and said DTMF pulses transmitted from said command location transmission means.

2. The system of claim 1 comprising a plurality of respective smoke generation machines, each with a respective receiving means, at a plurality of respective remote locations.

3. The system of claim 1 wherein the said tone generator device comprises a key pad, portable pocket type tone generator.

4. The system of claim 3 wherein the said transmission means is comprised of a walkie-talkie unit.

5. The system of claim 4 wherein the said receiving means is comprised of a walkie-talkie unit.

6. The system of claim 2 wherein a plurality of respective different DTMF tone signals are utilized, each one for commanding a respective one of said smoke generation machines, said DTMF tone signals being transmitted from said transmission means and detected by a respective said receiving means which is assigned to a particular respective DTMF tone signal.

* * * * *